United States Patent
Hennig

(10) Patent No.: US 12,095,980 B2
(45) Date of Patent: Sep. 17, 2024

(54) AUTOMATED FLUORESCENCE IMAGING AND SINGLE CELL SEGMENTATION

(71) Applicant: Canopy Biosciences, LLC, St. Louis, MO (US)

(72) Inventor: Christian Hennig, Hannover (DE)

(73) Assignee: Canopy Biosciences, LLC, St. Louis, MO (US)

( * ) Notice: Subject to any disclaimer, the term of this patent is extended or adjusted under 35 U.S.C. 154(b) by 0 days.

(21) Appl. No.: 18/489,435

(22) Filed: Oct. 18, 2023

(65) Prior Publication Data

US 2024/0048685 A1    Feb. 8, 2024

Related U.S. Application Data

(62) Division of application No. 17/193,988, filed on Mar. 5, 2021, now Pat. No. 11,825,069.

(60) Provisional application No. 62/985,539, filed on Mar. 5, 2020.

(51) Int. Cl.
| | |
|---|---|
| *G06T 7/00* | (2017.01) |
| *G06V 10/143* | (2022.01) |
| *G06V 20/69* | (2022.01) |
| *H04N 17/00* | (2006.01) |
| *H04N 23/741* | (2023.01) |
| *H04N 25/611* | (2023.01) |

(52) U.S. Cl.
CPC ......... *H04N 17/002* (2013.01); *G06T 7/0012* (2013.01); *G06V 10/143* (2022.01); *G06V 20/695* (2022.01); *H04N 23/741* (2023.01); *H04N 25/611* (2023.01); *G06T 2207/10056* (2013.01); *G06T 2207/10064* (2013.01); *G06T 2207/20081* (2013.01); *G06T 2207/20084* (2013.01); *G06T 2207/20208* (2013.01); *G06T 2207/30024* (2013.01)

(58) Field of Classification Search
CPC ........... G06T 2207/10064; G06T 2207/10121
USPC .......................................................... 348/79
See application file for complete search history.

(56) References Cited

U.S. PATENT DOCUMENTS

| | | |
|---|---|---|
| 8,995,740 B2 | 3/2015 | Santamaria-Pang et al. |
| 10,699,163 B1 | 6/2020 | Shah et al. |
| 10,955,418 B2 | 3/2021 | Hennig |
| 2011/0311966 A1 | 12/2011 | Hennig et al. |

(Continued)

FOREIGN PATENT DOCUMENTS

| | | |
|---|---|---|
| EP | 2606333 A1 | 6/2013 |
| EP | 3296742 A1 | 3/2018 |

(Continued)

OTHER PUBLICATIONS

Extended European Search Report in EP20186057.4, mailed Aug. 14, 2020, 11 pages.

(Continued)

*Primary Examiner* — Jeffery A Williams
(74) *Attorney, Agent, or Firm* — Lewis Rice LLC

(57) ABSTRACT

Systems and methods for automated, non-supervised, parameter-free segmentation of single cells and other objects in images generated by fluorescence microscopy. The systems and methods relate to both improving initial image quality and to improved automatic segmentation on images. The methods will typically be performed on a digital image by a computer or processor running appropriate software stored in a memory.

9 Claims, 8 Drawing Sheets

(56) References Cited

U.S. PATENT DOCUMENTS

| | | |
|---|---|---|
| 2012/0129193 A1 | 5/2012 | Hennig et al. |
| 2013/0203082 A1 | 8/2013 | Gonda et al. |
| 2015/0109432 A1 | 4/2015 | Dixon et al. |
| 2015/0286887 A1 | 10/2015 | Dave et al. |
| 2016/0069782 A1 | 3/2016 | Sood et al. |
| 2016/0178490 A1 | 6/2016 | Civel et al. |
| 2018/0210197 A1 | 7/2018 | Dave et al. |
| 2018/0292304 A1* | 10/2018 | Otsuka ............... G01N 15/1436 |
| 2019/0339203 A1 | 11/2019 | Miller et al. |
| 2019/0339204 A1 | 11/2019 | Singer et al. |
| 2022/0387127 A1 | 12/2022 | Kao et al. |

FOREIGN PATENT DOCUMENTS

| | | |
|---|---|---|
| EP | 3742164 A1 | 11/2020 |
| JP | 2006003154 A | 1/2006 |

OTHER PUBLICATIONS

Extended European Search Report in EP21210294.1, mailed Jan. 18, 2022, 11 pages.

Gratama et al., "Flow Cytometric Enumeration of CD34+ Hematopoietic Stem and Progenitor Cells," Cytometry (Communication in Clinical Cytometry), 1998, vol. 34, pp. 128-142.

Hennig et al., "A Versatile Platform for Comprehensive Chip-Based Explorative Cytometry," Cytometry Part A: The Journal of the International Society for Advancement of Cytometry, 2009, vol. 75A, pp. 362-370.

International Preliminary Report on Patentability in PCT/US2021/021197, mailed Sep. 6, 2022, 7 Pages.

Roederer et al., "Cell-by-Cell Autofluorescence Correction for Low Signal-to-Noise Systems: Application to Epidermal Growth Factor Endocytosis by 3T3 Fibroblasts," Cytometry, 1986, vol. 7, pp. 558-565.

Skuljec et al., "Monocyte/macrophage lineage commitment and distribution are affected by the lack of regulatory T cells in scurfy mice," European Journal of Immunology, 2016, vol. 46, pp. 1656-1668.

Smith et al., "A Simple Correction for Cell Autofluorescence for Multiparameter Cell-based Analysis of Human Solid Tumors," Cytometry Part B: Clinical Cytometry: The Journal of the International Society for Analytical Cytology, 2006, vol. 70B, pp. 91-103.

Zellkraftwerk, "Next Generation Cytometry", zellkraftwerk.com, 2016, Retrieved from Internet: <https://web.archive.org/web/20160405094646/hllp://zellkraflwerk.com/TECHNOLOGY.phtml>, 9 pages.

Bajcsy et al., "Survey statistics of automated segmentations applied to optical imaging of mammalian cells," BMC Bioinformatics, 2015, vol. 16, No. 330, 28 pages.

Ettinger et al., "Fluorescence Live Cell Imaging," Methods in Cell Biology, 2014, vol. 123, pp. 77-94.

Fluorescence Imaging principles and methods, Technical Manual, Amersham Pharmacia Biotech Inc., 2000 [retrieved on Dec, 6, 2023]. Retrieved from the Internet: <URL:https://www.bu.edu/picf/files/2010/10/Fluor-ImagingPrinciples.pdf>, 144 pages.

Partial Supplementary European Search Report in EP21764120.8, mailed Mar. 14, 2023, 14 pages.

Principles of Fluorescence and Fluorescence Microscopy, Technology Note, Carl Zeiss Microscopy GmbH, May 2019 [retrieved on Dec. 6, 2023]. Retrieved from the Internet: <URL:https://pages.zeiss.com/rs/896-XMS-794/images/ZEISS-Microscopy_Technology-Note_Principles-of-Fluorescence.pdf>, 7 pages.

Xing et al., "Robust Nucleus/Cell Detection and Segmentation in Digital Pathology and Microscopy Images: A Comprehensive Review," IEEE Reviews in Biomedical Engineering, 2016, vol. 9, pp. 234-263.

Extended European Search Report issued for European Application No. 21764120.8 on Jul. 22, 2024, 18 pages.

* cited by examiner

AUTOMATED FLUORESCENCE IMAGING AND SINGLE CELL SEGMENTATION

CROSS REFERENCE TO RELATED APPLICATION(S)

This application is a Divisional of U.S. patent application Ser. No. 17/193,988, filed Mar. 5, 2021, which claims the benefit of U.S. Provisional Patent Application Ser. No. 62/985,539, filed Mar. 5, 2020. The entire disclosure of all the above documents is herein incorporated by reference.

BACKGROUND OF THE INVENTION

Field of the Invention

This disclosure is related to the field of analysis of digital images and particularly to automated analysis of digital images generated by fluorescence microscopy to perform single cell or other object segmentation on those images.

Description of the Related Art

Flow cytometers (FCM) and fluorescence-activated cell sorters (FACS) are currently some of the primary tools for the characterization of cells. Both systems utilize fluorescent antibodies or other fluorescing probes (fluorophores) to tag cells having particular characteristics of interest and then detect the fluoresced light to locate the target cells. Both systems are widely used in both biomedical research and clinical diagnostics and can be used to study physical properties (for example, cell size and shape) and biochemical properties (for example, cell cycle distribution and DNA contents) of cells. Flow cytometry has also become a valuable clinical tool to monitor the progression of certain cell diseases.

Information about the cells of interest will typically be obtained optically. FCM/FACS involves the introduction of specific tagged probes, which fluoresce at a certain wavelength when exposed to a certain light input, and the connection of the tagged probe to a target of interest allows for the identification of individual cells to which the probe has attached. It should be recognized that in FCM/FACS, the measured signal is not clean. The fluorescence is typically detected optically by a device such as a photomultiplier tube (PMT) and the PMT receives background signal (light pollution) and autofluorescence of the cell in addition to light from the markers. Further, even light specifically from the markers can be obtained from non-specifically bound markers present in the sample. This is in addition to the specifically bound markers attached to target molecules on or in the cells, which is the value of interest.

For determining the desired result, only the signal of the specifically bound markers is of relevance and the rest of the measured signal is considered "noise" or error. This error inhibits the specific signal from being measured as sensitively as is often desired and in cases of a low intensity of the specific signal and a relatively high intensity of the noise, the specific signal may "disappear" in the noise leading to the false negative results. The amount of noise (signal-to-noise ratio), therefore, influences the detection sensitivity of the measurement. Further, the noise can also influence the distinction between positive and negative cell populations, as the measured positive and negative values may become indistinguishable.

The main reasons for measurement errors are background signals (pollution) within the small dynamic range of the detection device, high autofluorescence signals of the cells, unspecific binding of the markers to the cell, and variations that occur during the staining process (e.g. different marker concentrations, labeling of the marker or staining conditions). While it is desirable to reduce the unspecific background signals as much as possible, FCM/FACS-based methods have only limited potential to reduce background signals. In principle, it is only possible to reduce the basic background signal of the FCM/FACS device by avoiding the accumulation or detection of interfering signals.

In order to eliminate the background signal of the detection device and the autofluorescence of the cells, currently known methods typically use a control sample in which the investigated cells are not treated with the fluorophore and the values of the background and autofluorescence from this sample are subtracted from the actual measurement runs. However, this approach has a number of drawbacks. By comparing two different populations of cells, additional measurement errors often occur. This is due to the fact that the populations may differ in their density, age, expression intensity of the investigated marker, etc. Further, also the fluorescence of the sample material (aside from the cells) may vary between different samples due to variations in their manufacturing processes or their compositions. Finally, and often most significantly, the control sample value is typically an average value that is calculated on the basis of a control sample measurement and does not take into consideration the variations that exist between individual cells.

One of the major issues in FACS, and the analysis of digital images of biological systems more generally, is the need for segmentation. Segmentation typically refers to the need to identify of boundaries of cells within a digital image generated of the cells. Once obtained, digital images such as those generated with the use of fluorophores need to be segmented so that individual cells can be identified, for example, so they can be counted. Segmentation is typically performed using an algorithm. A watershed transform is one image processing technique that has been used for segmenting images of cells. With the watershed transform, a digital image may be modeled as a three-dimensional topological surface, where intensity values of pixels represent geographical heights. Thus, items associated with more of the fluorophore (which may, for example, be the nucleus of a cell) are identified as peaks or "volcanos" while cell walls would be in valleys between peaks.

A problem with many segmentation algorithms, however, is variations in the histology of different tissue types and cells. Thus, certain algorithms may not produce an accurate segmentation without adaptation or training to the specific type of cell. This difference can also make training automated segmentation systems very difficult. Algorithms can fail both directions causing an image to be over-segmented (indicating a complete cell where only a portion of a cell is present) or under-segmented (indicating a single cell when there are multiple cells present).

To try and combat the problem, alternative algorithms have been proposed including those discussed in U.S. Pat. No. 8,995,740, the entire disclosure of which is herein incorporated by reference. These systems, however, often still have problems due to underlying image capture quality where even the best algorithms cannot operate to their fullest potential, and even then they often still have trouble with topological structures (such as "atolls") which can be common in certain cell images.

This problem becomes particularly acute because training methods for automated analysis of cells are typically trained on a wide variety of heterogeneous cells. Thus, cells having a low autofluorescence and cells having a high autofluorescence are typically calibrated against the same average control sample value (or training data), with the result that cells having a low autofluorescence are prone to be evaluated as false negatives and cells having a high autofluorescence are likely to be evaluated as false positives. As all the above can significantly impair sensitivity of the detection method, it would be desirable to have methods available that overcome the drawbacks of existing methods and allow a more sensitive and reliable cell analysis.

U.S. patent application Ser. No. 15/708,221, the entire disclosure of which is herein incorporated by reference, provides for systems and methods that can be used to cancel autofluorescence and background noise more effectively. Specifically, this is performed by determining the autofluorescence not from a generalized sample or training selection of materials, but from the actual sample which is to be tested. This provides for substantial improvement in signal-to-noise ratio. However, those systems and methods do not provide for advanced calibration techniques utilizing a high dynamic ranging imaging (HDRI) camera and do not provide for advanced processing techniques that can provide increased accuracy in cell segmentation when images have been so prepared.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, there is described herein, among other things, a method for calibrating an imaging system for cellular imaging, the method comprising: providing an imaging system for imaging cells which have tagged with a fluorophore having a range of fluorescing wavelengths; performing a calibration for autofluorescence comprising: providing the imaging system with a sample of unstained cells having a range of autofluorescing wavelengths; illuminating the sample with a source of illumination; imaging the sample across a dynamic range including all of the range of fluorescing wavelengths and all of the range of autofluorescing wavelengths; performing a calibration for chromatic aberration comprising: providing the imaging system with a sample of cells; illuminating the sample with a source of illumination; obtaining a first image of the sample of cells; altering a position of the imaging system relative to the sample of cells; and obtaining a new image of the sample of cells.

In an embodiment, of the method, the method is performed by a digital computer including memory with instructions for performing the method In an embodiment of the method, a minimum photon acquisition time of the imaging system is set separately for each wavelength within the dynamic range; and the minimum photon acquisition time is sufficient for detection of all values within the complete dynamic range.

In an embodiment of the method, the dynamic range comprises all wavelengths the imaging system images.

In an embodiment of the method, the imaging system comprises a digital grayscale camera.

In an embodiment of the method, the camera is provided with a filterset based on the fluorophore.

In an embodiment of the method, the camera is a High Dynamic Range Imaging (HDRI) camera.

In an embodiment of the method, the camera generates High Dynamic Range (HDR) by exposure fusion to provide for improved contrast.

In an embodiment of the method, the cells which have tagged with the fluorophore are a different type of cells to the unstained cells In an embodiment of the method, the sample of cells is a different type of cells to the sample of unstained cells.

In an embodiment of the method, the sample of cells is the sample of unstained cells.

There is also described herein, in an embodiment, a method for analyzing a cellular image, the method comprising: providing a sample of cells which have been tagged with a fluorophore having a range of fluorescing wavelengths; illuminating the sample with a source of illumination; imaging the illuminated sample over the range of fluorescing wavelengths to produce a sample image; subtracting a calibration image from the sample image to produce a calibrated image; representing the image as a topological curve, a height of the curve at each curve pixel representing an intensity of fluorescence at an image pixel in the calibrated image; searching the topological curve for a pixel grouping having height above a selected height; choosing a new height, lower than the selected height; repeating the searching using the new height as the selected height; and for each identified pixel grouping: following a convex border of the topological curve away from the pixel group to an inflection point where inflexion is decreasing at a convex side; and identifying the convex border including the pixel group as a cell in the calibrated image.

In an embodiment, of the method, the method is performed by a digital computer including memory with instructions for performing the method In an embodiment of the method, the calibration image is formed by a method comprising: providing the imaging system with a sample of unstained cells having a range of autofluorescing wavelengths; illuminating the sample with a source of illumination; and imaging the sample across a dynamic range including all of the range of fluorescing wavelengths and all of the range of autofluorescing wavelengths;

In an embodiment of the method, a minimum photon acquisition time of the imaging system is set separately for each wavelength within the dynamic range; and the minimum photon acquisition time is sufficient for detection of all values within the complete dynamic range.

In an embodiment of the method, the dynamic range comprises all wavelengths the imaging system images.

In an embodiment, the method, further comprises: before obtaining the sample image, performing a calibration for chromatic aberration on the imaging system, the calibration comprising: illuminating the sample of cells with a source of illumination; obtaining a first image of the sample of cells from the imaging system in a first position; moving the imaging system to a second different position relative to the sample of cells; obtaining a second image of the sample of cells; and when generating the sample image: positioning the imaging system in the first position if the first image is optimized compared to the second image; and placing the imaging system if it is not.

In an embodiment of the method, the imaging system comprises a digital grayscale camera provided with a filterset based on the fluorophore.

In an embodiment of the method, the imaging system comprises a High Dynamic Range Imaging (HDRI) camera.

In an embodiment of the method, the imaging system generates High Dynamic Range (HDR) by exposure fusion to provide for improved contrast.

In an embodiment of the method, the calibrated image is used to train a neural network.

DETAILED DESCRIPTION OF PREFERRED EMBODIMENTS

Figure 1:
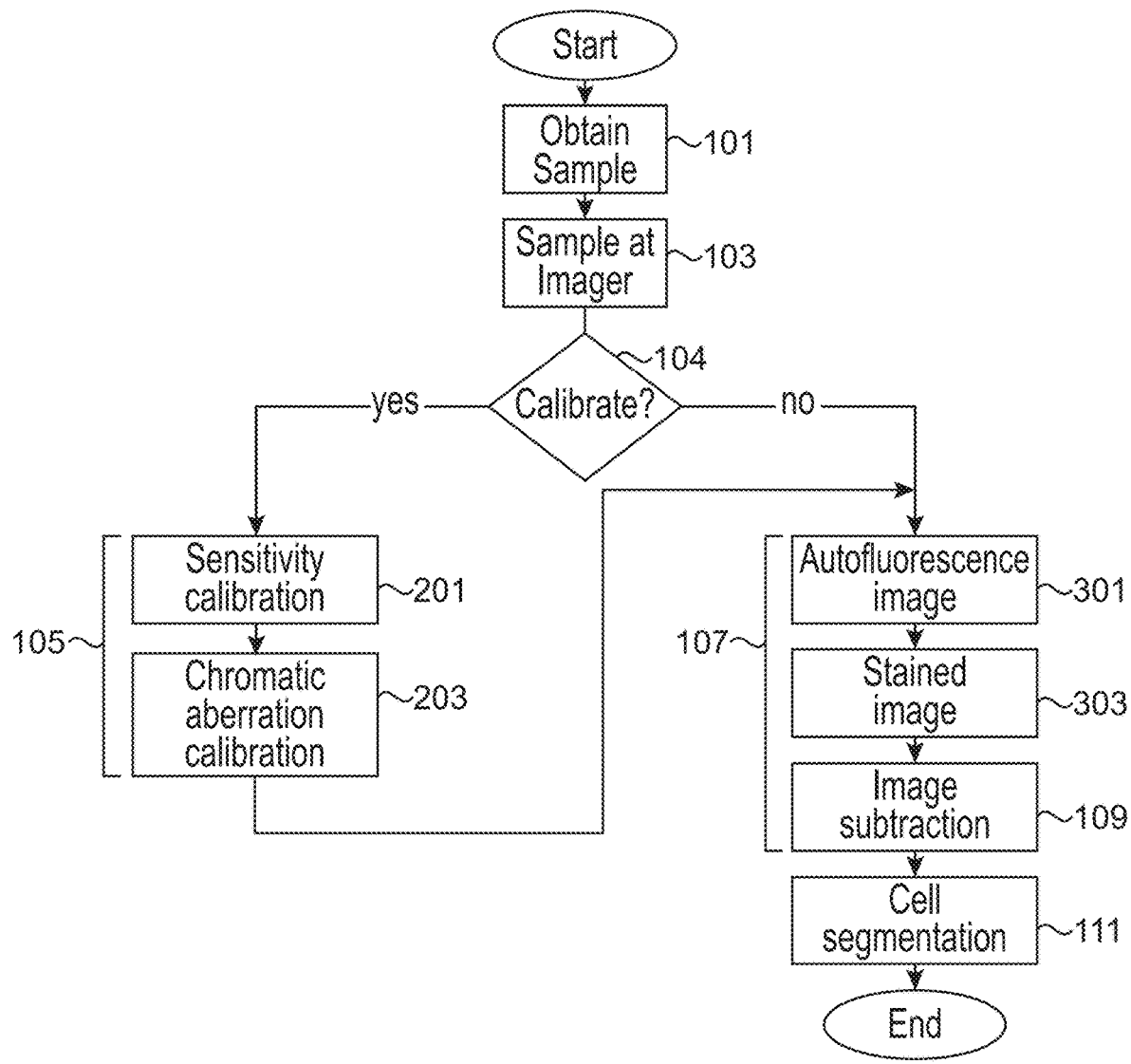
FIG. 1 shows a flowchart of an embodiment of a method for automated image processing which may be used to prepare images for cell segmentation.

FIG. 1 provides a flowchart of an embodiment of a method for automated, non-supervised, parameter-free segmentation of single cells and other objects in images generated by fluorescence microscopy. This method will typically be performed on a digital image by a computer or processor running appropriate software stored in a memory. However, in an alternative embodiment, the method may be implemented through electromechanical hardware, such as but not limited to circuitry. The systems and methods will typically be provided as part of the operation of, or with, an automated microscope with a digital image sensor like a charge couple device (CCD) or complementary metal oxide semiconductor (CMOS). The computer in combination with such software or the hardware so designed comprises an embodiment of a system of the present invention as do such elements in conjunction with other elements of cell or other biological tissue analysis.

Throughout this disclosure, the term "computer" describes hardware that generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including, but not limited to eyewear, wrist wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, may refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices that are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software may be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "real-time" generally refers to software performance and/or response time within operational deadlines that are effectively generally cotemporaneous with a reference event in the ordinary user perception of the passage of time for a particular operational context. Those of ordinary skill in the art understand that "real-time" does not necessarily mean a system performs or responds immediately or instantaneously. For example, those having ordinary skill in the art understand that, where the operational context is a graphical user interface, "real-time" normally implies a response time of about one second of actual time for at least some manner of response from the system, with milliseconds or microseconds being preferable. However, those having ordinary skill in the art also understand that, under other operational contexts, a system operating in "real-time" may exhibit delays longer than one second, such as where network operations are involved which may include multiple devices and/or additional processing on a particular device or between devices, or multiple point-to-point round-trips for data exchange among devices. Those of ordinary skill in the art will further understand the distinction between "real-time" performance by a computer system as compared to "real-time" performance by a human or plurality of humans. Performance of certain methods or functions in real-time may be impossible for a human, but possible for a computer. Even where a human or plurality of humans could eventually produce the same or similar output as a computerized system, the amount of time required would render the output worthless or irrelevant because the time required is longer than how long a consumer of the output would wait for the output, or because the number and/or complexity of the calculations, the commercial value of the output would be exceeded by the cost of producing it.

The definitions provided in U.S. patent application Ser. No. 15/708,221 are also relevant to the discussion herein and those definitions are specifically incorporated by reference as definitions for those terms as used herein.

The present image analysis will typically be performed by the computer in real-time so as to allow the analysis results to be readily useable in both research and diagnostic or clinical settings and for the selection of treatment for disease indicated via the image analysis. Further, the process is typically automated so that the image analysis can be performed either with minimal or with no human intervention. Specifically, the image analysis is typically performed with a computer performing the acts of obtaining images and/or evaluating the images for segmentation of cells within the image without a human being needing to assist in the analysis. Most of the time, the automated systems will be further combined with other automated systems which can utilize the segmented image to provide further evaluation of the cells of interest to a human user, but this is by no means required.

The present systems and methods, in an embodiment, combine systems and methods for improving both the process of image acquisition (for providing improved input data for the image processing step) and image processing in the nature of cell segmentation. However, one of ordinary skill in the art would recognize that the image acquisition discussed herein could be used to provide improved images to traditional image processing systems and methods and that traditional image acquisition systems could also be used to provide data to the present image processing systems in alternative embodiments.

Image processing elements discussed herein are typically designed to handle a high heterogeneity of input data related to cell segmentation. Heterogeneity within the samples can be caused by, for example, different sample sources of the underlying cells (e.g., brain, liver, spleen), sample quality, staining quality, or other factors. In other embodiments, the systems and methods herein can be used to evaluate images directed to things other than cells which may have high or low heterogeneity. For example, the systems for image acquisition discussed herein can be used to improve signal-to-noise ratio with fluorescence-based images of virtually anything. Further, segmentation of images need not provide for detection of individual biological cells, but may be used to detect other subcomponents of an image where segmentation is determined to be useful. However, for ease of discussion, the present disclosure will utilize as an exemplary embodiment the imaging of cells (specifically biological cells) and segmenting of those images to detect individual cells.

As shown in FIG. 1, the method and operation of the system typically first comprises obtaining a sample of cells which will typically be immobilized on a solid substrate (101). This may be performed by any method known to those of ordinary skill in the art and all such known methods are incorporated herein by reference. U.S. patent application Ser. Nos. 15/708,221 and 13/126,116, the entire disclosures of which are herein incorporated by reference, provide examples of embodiments of how such immobilization and sample preparation may be performed.

Once the sample is obtained (101), the sample is exposed to an image acquisition system (103). The image acquisition system will typically be a digital grayscale camera and the camera will typically be provided with a filterset which will be selected based on the fluorophore to be used in the imaging. The camera will typically be of the form of a High Dynamic Range Imaging (HDRI) camera or a software algorithm that controls a camera in a way that it generates HDR by exposure fusion to provide for improved contrast. The systems and methods discussed herein can utilize a camera wherein HDRI is provided using multiple exposures or with a single exposure depending on the camera selected and the specific embodiment of the systems and methods being utilized.

The image acquisition system may first be calibrated (105) with typically two calibration actions (201) and (203). However, calibration (105) does not have to be performed necessarily during or coextensively with image acquisition (107). Alternatively, calibration (105) can alternatively be performed during setup or maintenance of the system, each day before starting imaging, or when needed. Thus, a decision (104) may be made to calibrate (105) the system or proceed directly to image acquisition (107). Further, calibration (105) may be performed without subsequent image acquisition (107) in which scenario the system would typically cease operation after element (203).

In the first calibration (201), the image acquisition system is calibrated against the autofluorescence of unstained cells as well as any inherent background signal utilizing any light sources that will be used in the actual imaging runs against a stained sample. In an embodiment, the minimum photon acquisition time will be set separately for each wavelength within the complete dynamic range of autofluorescence plus the fluorescently labeled detectors to provide for a signal which is sufficient for detection of all values. To put this another way, the dynamic range of the imaging can be chosen to insure it includes any autofluorescence or background signal detected at any wavelength detectable by the camera as well as the specific wavelengths for the fluorophore selected for staining.

This type of first calibration (201) is generally used to compensate for the differences in sensitivity of the image acquisition system with regards to different wavelengths that it can detect and which may be present. The first calibration will typically allow for a determination of what is background and autofluorescence for the present sample based on current measurement and, therefore, this can reduce reliance on signal size to determine if signals are of interest or are noise.

Figure 2:
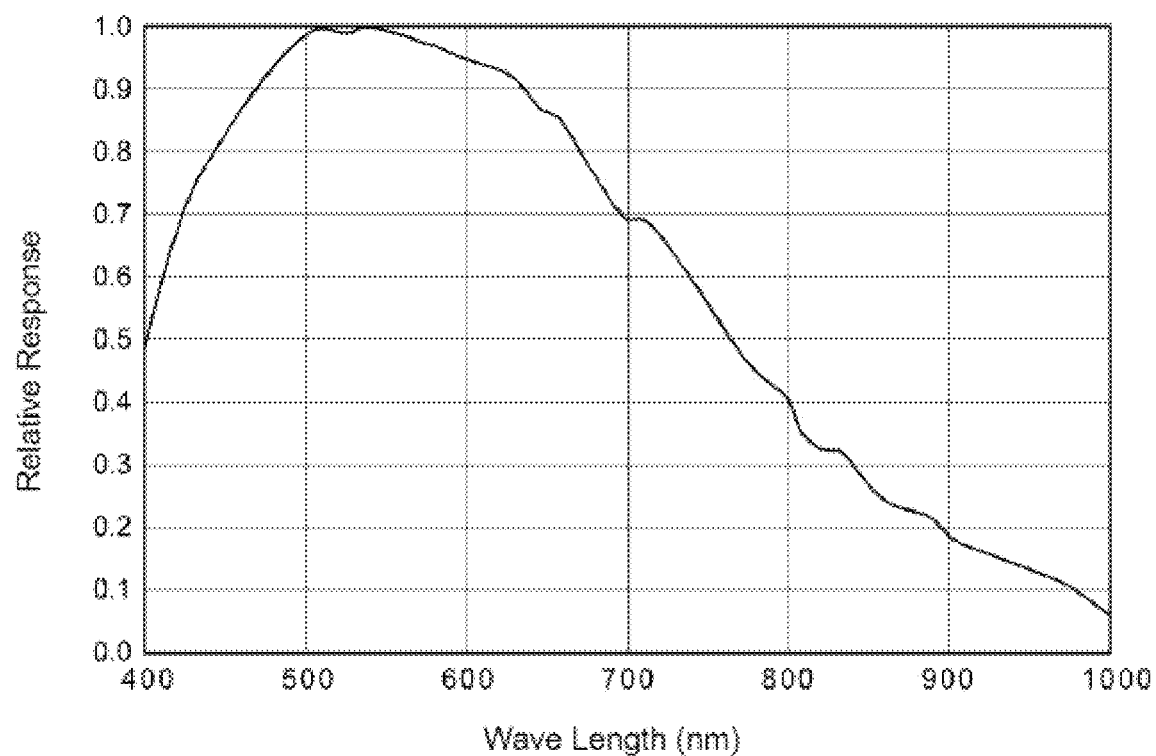
FIG. 2 shows a sensitivity curve of a common CCD chip.

As an example, FIG. 2 provides the sensitivity curve (401) of a common CCD chip which may be used in the image acquisition system. In the chip of FIG. 2, at lower and higher wavelengths, longer exposure times may be used to assure that the lower limit of the dynamic range of the image acquisition system is capable of capturing the autofluorescence of any cell present in the sample within the dynamic range of the camera for each used acquisition wavelength. It should be recognized that any particular imaging run of the system or method may utilize any or all of the available range of the camera. This first calibration (201) will typically be run at all wavelengths (or at selected subgroupings of wavelengths depending on sensitivity and time constraints) that are to be used in the acquisition run of this particular sample which is referred to as the dynamic range.

In the second calibration (203), the image acquisition system is calibrated for chromatic aberration. Chromatic aberration (which is commonly called the "rainbow effect") leads to projection of photons from a single position on the specimen to different locations on the camera dependent on the wavelength of the photon and lens and/or chip design. When not compensated, the x-. y-, and z-axis offsets between different wavelengths leads to blurring of the image or offset thus lowering the quality of input data for the segmentation process. The second calibration (203) will typically be performed by taking non-calibrated images in a first round. These images may be taken of stained or unstained samples depending on embodiment. In a second and following rounds, the x, y, and z positioning of the imager is changed leaving the sample constant. The position movement is typically in a stepwise or likewise repeatable manner to find an optimal x, y, and z offset between the single filtersets used for the different wavelengths. This calibration will then be used during the actual imaging runs.

Figure 3A:
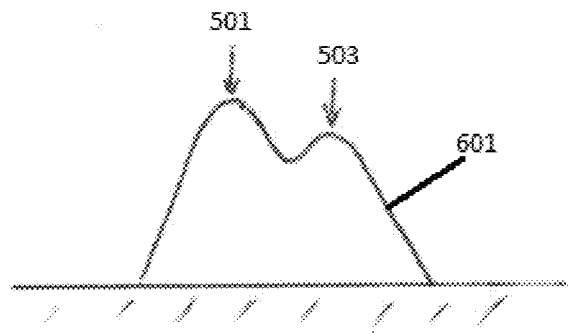
FIG. 3A shows a topological representation of two adjacent cells with the image acquisition calibrated in accordance with the first calibration.
Figure 3B:
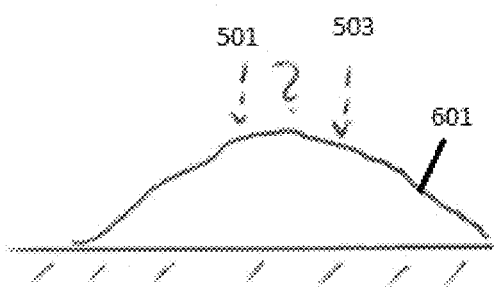
FIG. 3B shows a topological representation of the two adjacent cells of FIG. 3A without the image acquisition calibrated in accordance with the first calibration.

FIGS. 3A and 3B show an example of how the second calibration (203) can improve image quality. FIG. 3A shows two adjacent cells (501) and (503) as peaks in a topological representation (staining intensity as height) (601) with the image acquisition system calibrated as contemplated in the second calibration. FIG. 3B shows the same two adjacent cells (501) and (503) without the second calibration having been performed which shows blurring due to offset imaging. As should be apparent, the blurring results in it being more difficult to differentiate the two different cells.

After the second calibration (203) is complete, the image acquisition system will typically be considered calibrated and ready to begin image acquisition (107). Image acquisition (107) will typically comprise at least two and possibly more acquisition passes and then correction (109) of the images to remove artifacts from autofluorescence and background signals. The first acquisition pass (301) will generally be done on a sample before staining.

The first acquisition pass (301) will typically be performed at a dynamic range that covers the complete dynamic range of autofluorescence in every imaged wavelength and, therefore, through the entire dynamic range of the camera which has been selected for this imaging. As should be apparent, this dynamic range will generally correspond to the dynamic range over which the first calibration (201) was performed. The first image acquisition (301) will also typically be performed with the same input light or lights that will be used in conjunction with the later acquisitions.

After this first pass (301) is completed, the sample will be exposed to the fluorophore (which is typically in the form of a detection conjugate having a binder portion and a fluorochrome portion) and stained as desired. The second pass (303) will involve essentially repeating the steps of the first image acquisition pass on the now stained sample. Acquisition will typically be performed over a dynamic range that covers the complete dynamic range of autofluorescence plus biomarker expression revealed by the fluorescently labeled detectors (e.g. antibodies, aptamers). It should be recognized that for simplicity the dynamic range of both the first image acquisition pass (301) and the second acquisition pass (303) may be the same, however, the first image acquisition pass (301) may utilize a smaller dynamic range since it is only looking for autofluorescence.

Figure 4A:
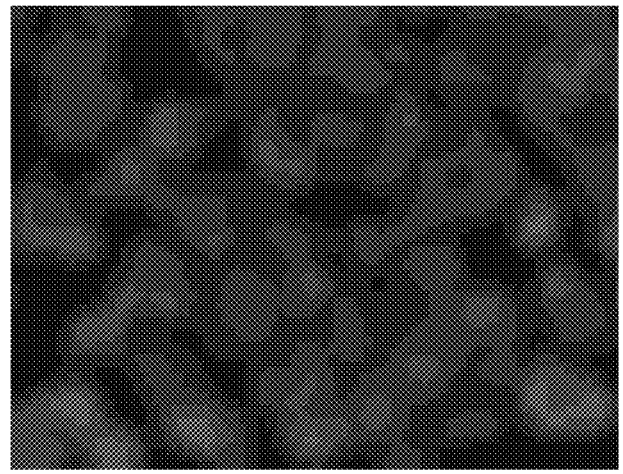
FIG. 4A shows a difficult-to-segment area of an FCM imaged with a standard low dynamic range camera.
Figure 4B:
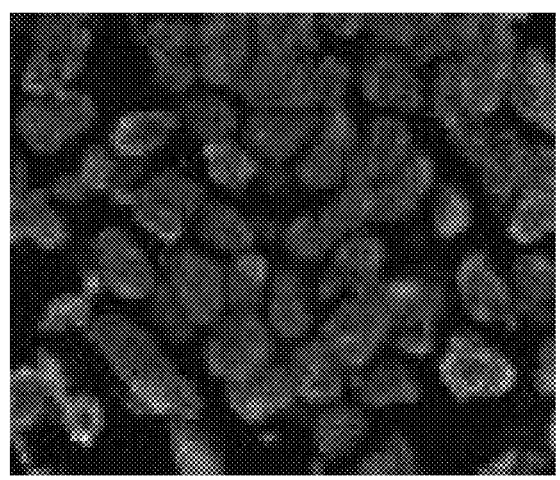
FIG. 4B shows the difficult-to-segment area of FIG. 4A imaged with a high dynamic range imaging (HDRI) camera.
Figure 5A:
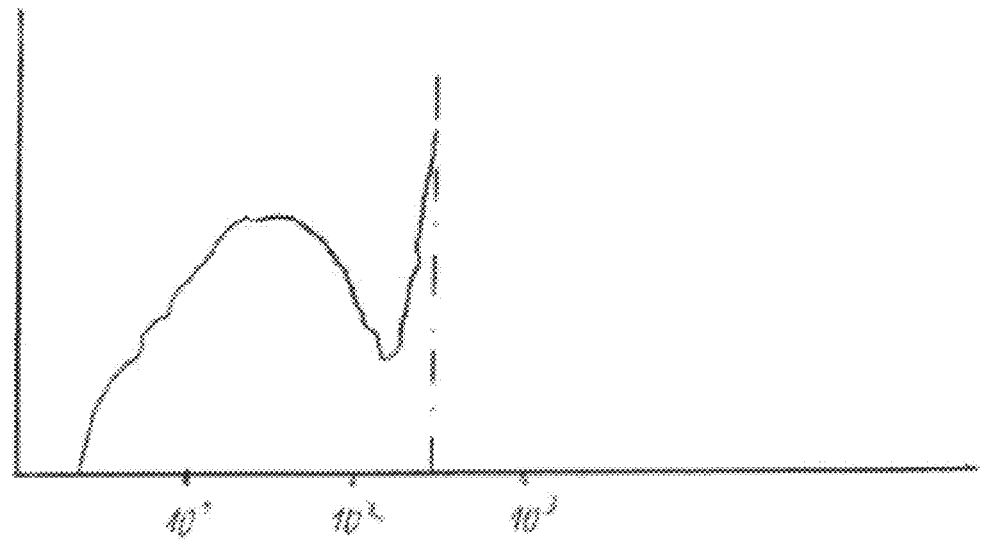
FIG. 5A shows a histogram of a low dynamic range camera. Specifically a microscope camera with 8 bits of dynamic range.
Figure 5B:
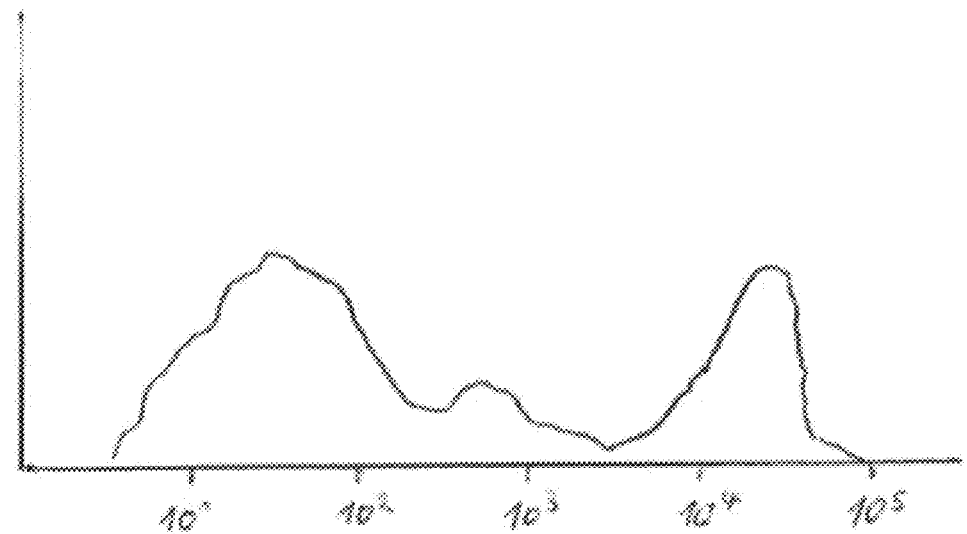
FIG. 5B shows a histogram of a high dynamic range imaging (HDRI) camera on the same image as FIG. 5A.

FIGS. 4A and 4B show an example of a difficult-to-segment area taken with a low dynamic range camera in FIG. 4A and an HDRI camera in FIG. 4B. Histograms generated from the images of FIGS. 4A and 4B are shown in FIGS. 5A and 5B reveal that only then HDRI images of FIG. 4B can cover the complete dynamic range of the fluorescence emitted by the sample, whereas standard microscope cameras with standard 8-bit dynamic range can only capture about 200 values of dynamic range. This lack of dynamic range in FIG. 4A results in the generation of artifacts and a less clear image which reduces the ability to segment cells in the image.

Figure 6A:
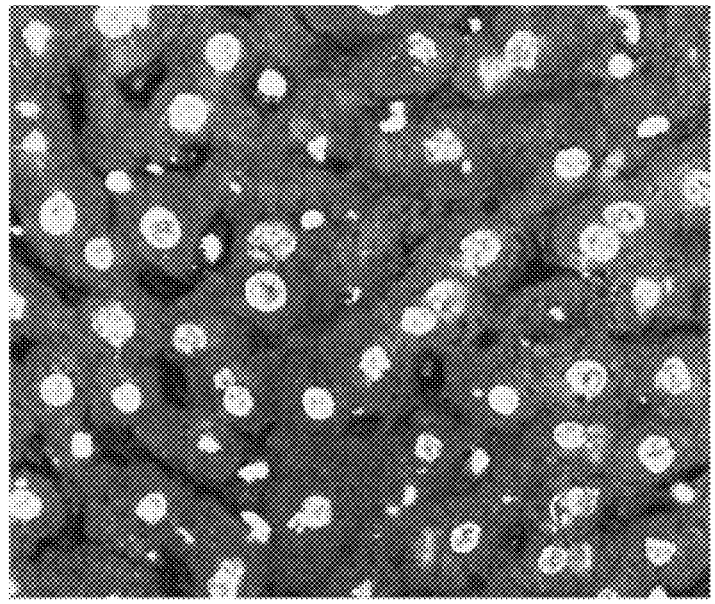
FIG. 6A shows a liver section stained for nuclei prior to the subtraction of the corresponding autofluorescence image.
Figure 6B:
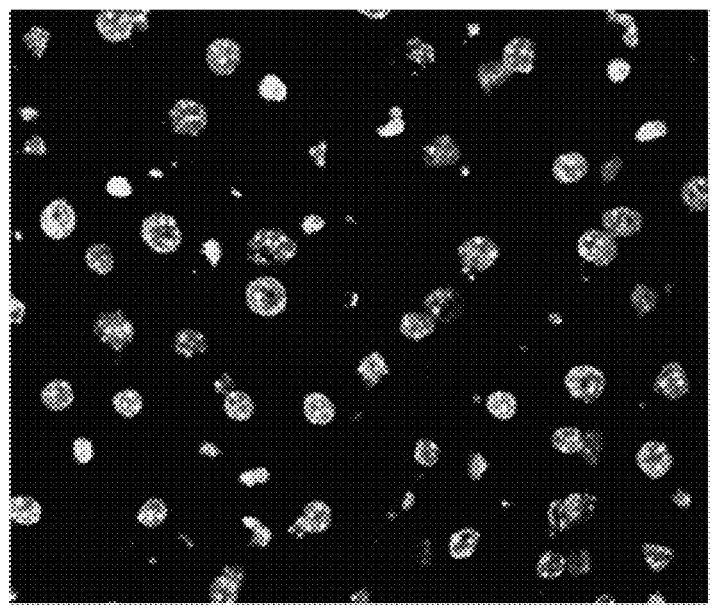
FIG. 6B shows the liver section of FIG. 6A after the subtraction of the corresponding autofluorescence image.

After the second image acquisition (303) is complete, the first pass image (301) will typically be subtracted from the second (and any other subsequent) pass image (303) in the correction (109). A methodology for doing this is discussed in the above referenced U.S. patent application Ser. No. 15/708,221 and is incorporated herein by reference. The subtraction serves to help eliminate illumination artefacts of the optical system appearing inside the image and also reduces autofluorescence signals obfuscating the signals generated by the staining itself. FIG. 6A shows a liver section stained for nuclei prior to correction (109), and FIG. 6B shows the same section with correction (109) having been performed.

Figure 7:
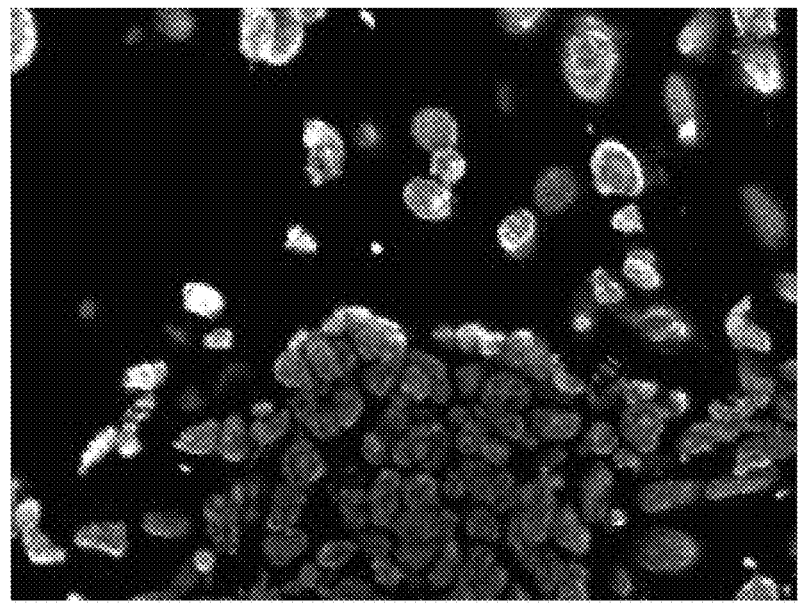
FIG. 7 shows a portion of an image which is particularly hard to segment due to variability in shape and staining intensity.

After the completion of the correction (109), The image is typically considered optimized for segmentation of single objects or cells. Segmentation (111) may be performed using any system or method known to a person having ordinary skill in the art. However, due to the very high variability of object shapes, sample, and staining quality, a robust algorithm or machine learning approach will typically be preferred to assure a high sensitivity and specificity of object recognition. FIG. 7 shows a particularly hard to segment image due to variability of shape and staining intensity.

In an embodiment, calibrated and optimized high dynamic range input image data may be obtained from a wide variety of sources utilizing the systems and methods discussed in FIG. 1 through the correction (109). These images may then be used to train a neural network (or similar processing system) with supervised learning and backpropagation to recognize single objects and object borders in the manner known to those having ordinary skill in the art. The images provided may be from heterogeneous sources with a wide array of dynamic ranges and fluorescence properties as the generation of such high quality images assists in the elimination of artifacts and differences across the sources. Alternatively, the neural network (or similar) may be provided with images from more homogenous sources (e.g. only one type of cell) if that is desired. This neural network may then be used to perform segmentation (111) in an embodiment.

Figure 8:
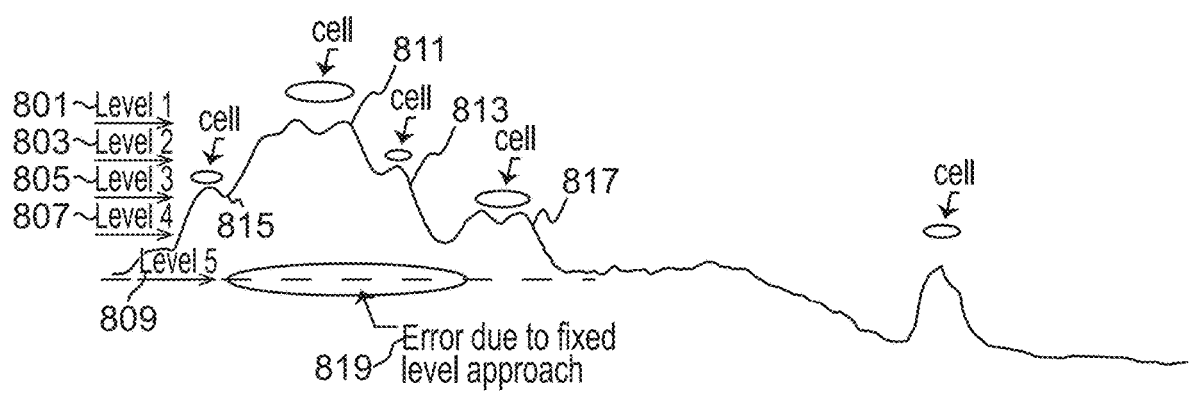
FIG. 8 shows a 2D topological curve showing the identification of seeds and cells with different "water levels" utilizing an inverse watershed methodology.

In the embodiment of FIGS. 7 and 8, the segmentation (111) is performed on the image using a form of inverse watershed transform which is referred to herein as cyclic seed detection or a "falling water level" analysis. Seed detection in conjunction with traditional watershed transform is discussed in, for example, U.S. Pat. No. 8,995,740 the entire disclosure of which is herein incorporated by reference.

In the cyclic seed detection system and method used herein, topological analysis is performed as in a watershed transform where the intensity of fluorescence is used to indicate a "height" of each pixel and therefore peaks in the topology will typically indicate a target element of a relevant cell (for example the cell nucleus). This is as is contemplated in FIGS. 3A and 3B above as well. Watershed transform, however, is prone to error for "atoll" or "erupted volcano" like objects (this could be an object such as seed (811) in FIG. 8). Objects such as these can be generated by staining quality or self-quenching, for example. In effect, traditional watershed transform requires perfect "volcano" shapes to work.

Figure 9:
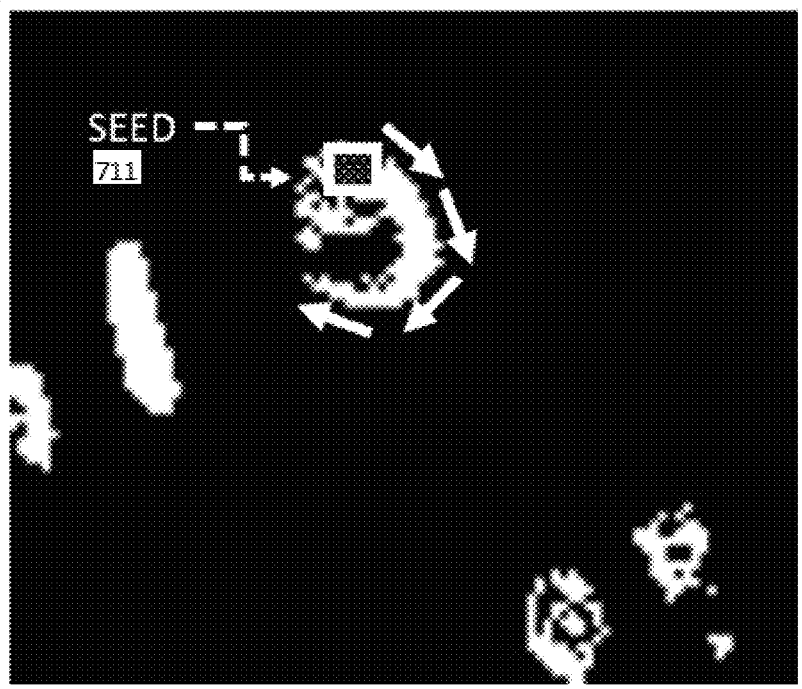
FIG. 9 shows a portion of an image with a seed identified.

Inverse watershed transform as contemplated herein serves to remove water slowly instead of the traditional watershed transform which floods the topology with water. FIG. 8 provides for an exemplary 2D topological curve from a portion of an image to illustrate the operation of the process of cyclic seed detection or inverse watershed transform. To begin with, a first intensity is selected which is the "high water level" (801). Any pixel grouping which is identified as being above this intensity (801) is provided as a seed (811) and will be identified as belonging to an individual cell. FIG. 9 provides for an example of a seed (711) within an image.

Returning to FIG. 8, a second lower intensity (803) is then selected and the process is repeated to identify additional seeds (813) which have now risen "above" the new "water level" (803) of this lower intensity (803). This lowering of the intensity and searching for new seeds will be repeated with new lower levels typically selected in a consistent stepwise fashion. In the embodiment of FIG. 8, two additional levels (805) and (807) are selected and each reveals a new seed (815) and (817). FIG. 8 also illustrates level (809) which would correspond to the initial reading on a more traditional watershed transform. This level would generate a single seed (819) instead of the three seeds (811), (813), and (815).

From each of these seeds (811), (813), (815) and (817) there is presumed to be an associated cell whose boundaries need to be detected. Thus, the seed can be used as a source to determine the extension of the cell belonging to the seed (811), (813), (815), and (817). This is typically carried out by following the convex border of the topological curve away from the seed (811), (813), (815) and (817) to try and find the outer rim of the "isle" by looking for inflection points where the inflexion is decreasing at the convex side. In FIG. 8, this results in the left portion of the image being segmented into the four target cells.

While the invention has been disclosed in connection with certain embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

It will further be understood that any of the ranges, values, properties, or characteristics given for any single component of the present disclosure may be used interchangeably with any ranges, values, properties, or characteristics given for any of the other components of the disclosure, where compatible, to form an embodiment having defined values for each of the components, as given herein throughout. Further, ranges provided for a genus or a category may also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "circular" are purely geometric constructs and no real-world component is a true "circle" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A method for analyzing a cellular image, the method comprising:
   providing a sample of cells which have been tagged with a fluorophore having a range of fluorescing wavelengths;
   illuminating said sample with a source of illumination;
   imaging said illuminated sample over said range of fluorescing wavelengths to produce a sample image;
   subtracting a calibration image from said sample image to produce a calibrated image;
   representing said image as a topological curve, a height of said curve at each curve pixel representing an intensity of fluorescence at an image pixel in said calibrated image;
   searching said topological curve for a pixel grouping having height above a selected height;
   choosing a new height, lower than said selected height;
   repeating said searching using said new height as said selected height; and
   for each identified pixel grouping:
      following a convex border of said topological curve away from said pixel group to an inflection point where inflexion is decreasing at a convex side; and
      identifying said convex border including said pixel group as a cell in said calibrated image.

2. The method of claim 1 wherein said calibration image is formed by a method comprising:
   providing said imaging system with a sample of unstained cells having a range of autofluorescing wavelengths;
   illuminating said sample with a source of illumination; and
   imaging said sample across a dynamic range including all of said range of fluorescing wavelengths and all of said range of autofluorescing wavelengths.

3. The method of claim 2 wherein:
   a minimum photon acquisition time of said imaging system is set separately for each wavelength within said dynamic range; and
   said minimum photon acquisition time is sufficient for detection of all values within said complete dynamic range.

4. The method of claim 2 wherein said dynamic range comprises all wavelengths said imaging system images.

5. The method of claim 1 further comprising:
   before obtaining said sample image, performing a calibration for chromatic aberration on said imaging system, said calibration comprising:
   illuminating said sample of cells with a source of illumination;
   obtaining a first image of said sample of cells from said imaging system in a first position;
   moving said imaging system to a second different position relative to said sample of cells;
   obtaining a second image of said sample of cells; and
   when generating said sample image:
      positioning said imaging system in said first position if said first image is optimized compared to said second image; and
      placing said imaging system if it is not.

6. The method of claim 1 wherein said imaging system comprises a digital grayscale camera provided with a filter-set based on said fluorophore.

7. The method of claim 1 wherein said imaging system comprises a High Dynamic Range Imaging (HDRI) camera.

8. The method of claim 1 wherein said imaging system generates High Dynamic Range (HDR) by exposure fusion to provide for improved contrast.

9. The method of claim 1 wherein said calibrated image is used to train a neural network.

* * * * *